US011016174B2

(12) United States Patent
Campbell et al.

(10) Patent No.: US 11,016,174 B2
(45) Date of Patent: *May 25, 2021

(54) RADAR MOUNTING ESTIMATION WITH UNSTRUCTURED DATA

(71) Applicant: Waymo LLC, Mountain View, CA (US)

(72) Inventors: Timothy Campbell, Mountain View, CA (US); Larry Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/221,990

(22) Filed: Dec. 17, 2018

(65) Prior Publication Data

US 2019/0120935 A1 Apr. 25, 2019

Related U.S. Application Data

(63) Continuation of application No. 15/054,570, filed on Feb. 26, 2016, now Pat. No. 10,191,144.

(51) Int. Cl.
*G01S 7/40* (2006.01)
*G01S 13/931* (2020.01)

(52) U.S. Cl.
CPC .......... *G01S 7/4026* (2013.01); *G01S 13/931* (2013.01); *G01S 2007/403* (2013.01);
(Continued)

(58) Field of Classification Search
CPC ............ G01S 13/931; G01S 2007/403; G01S 2007/4034; G01S 7/4026;
(Continued)

(56) References Cited

U.S. PATENT DOCUMENTS 6,020,844 A * 2/2000 Bai ....................... G01S 7/4026
342/147
7,307,583 B1 * 12/2007 Woodell ................ G01S 7/4026
342/173
(Continued)

FOREIGN PATENT DOCUMENTS

EP 1947473 A2 7/2008
EP 2500745 A2 9/2012
(Continued)

OTHER PUBLICATIONS

Search Report and Written Opinion for PCT/US2017/012664 dated Mar. 30, 2017.
(Continued)

*Primary Examiner* — Timothy X Pham
(74) *Attorney, Agent, or Firm* — McDonnell Boehnen Hulbert & Berghoff LLP

(57) ABSTRACT

The present application describes a method including transmitting at least two radar signals by a radar unit of a vehicle, where a first signal is transmitted from a first location and a second signal is transmitted from a second location. The method also includes receiving a respective reflection signal associated with each of the transmitted signals. Additionally, the method includes determining, by a processor, at least one stationary object that caused a reflection. Further, the method includes based on the determined stationary object, determining, by the processor, an offset for the radar unit. The method yet further includes operating the radar unit based on the determined offset. Furthermore, the method includes controlling an autonomous vehicle based on the radar unit being operated with the determined offset.

12 Claims, 5 Drawing Sheets

(52) U.S. Cl.
CPC ............... *G01S 2007/4034* (2013.01); *G01S 2013/9327* (2020.01); *G01S 2013/93273* (2020.01); *G01S 2013/93275* (2020.01); *G01S 2013/93277* (2020.01)

(58) Field of Classification Search
CPC ... G01S 2013/9327; G01S 2013/93273; G01S 2013/93275; G01S 2013/93277; G01S 2013/9371; G01S 2013/9382; G01S 2013/9389; G01S 2013/9396
See application file for complete search history.

(56) References Cited

U.S. PATENT DOCUMENTS

| | | | |
|---|---|---|---|
| 7,522,092 B2 | 4/2009 | Okai et al. | |
| 7,965,225 B1* | 6/2011 | Dickerson | G01S 7/4026 342/73 |
| 8,676,427 B1 | 3/2014 | Ferguson et al. | |
| 8,994,581 B1 | 3/2015 | Brown | |
| 2004/0027272 A1 | 2/2004 | Richardson | |
| 2013/0103298 A1 | 4/2013 | Becket et al. | |
| 2013/0307718 A1 | 11/2013 | Aoki et al. | |
| 2015/0314785 A1 | 11/2015 | Kwon | |
| 2020/0033444 A1* | 1/2020 | Marsch | G01S 13/723 |

FOREIGN PATENT DOCUMENTS

| | | |
|---|---|---|
| GB | 2363016 A | 12/2001 |
| JP | 2861995 B1 | 2/1999 |
| JP | 2002228749 A | 8/2002 |
| JP | 2003177176 A | 6/2003 |
| JP | 2004317507 A | 11/2004 |
| JP | 2010127743 A | 6/2010 |
| WO | 2006035510 A1 | 5/2008 |

OTHER PUBLICATIONS

European Search Report for corresponding European application No. EP17756940, dated Sep. 24, 2019.

* cited by examiner

RADAR MOUNTING ESTIMATION WITH UNSTRUCTURED DATA

CROSS-REFERENCE TO RELATED APPLICATION

The present disclosure is a continuation of U.S. patent application Ser. No. 15/054,570, filed on Feb. 26, 2016, and entitled "Radar Mounting Estimation with Unstructured Data," the entire contents of which are herein incorporated by reference as if fully set forth in this description.

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Gigahertz (GHz), which corresponds to a millimeter (mm) wave electromagnetic wavelength (e.g., 3.9 mm for 77 GHz). These radar systems may use antennas that can focus the radiated energy into tight beams in order to enable the radar system to measure an environment with high accuracy, such as an environment around an autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

SUMMARY

Disclosed herein are embodiments that relate to determining an offset for automotive radar based on unstructured data. In one aspect, the present application describes a method including transmitting a plurality of radar signals from a plurality of different locations by a radar unit of a vehicle. The method also includes receiving a plurality of reflection signals, where each reflection signal is associated with one of the transmitted radar signals. Additionally, the method includes determining, by a processor, at least one stationary object that caused reflection in the plurality of reflection signals. Further, the method includes based on the determined stationary object, determining, by the processor, an offset for the radar unit. The method yet further includes operating the radar unit based on the determined offset. Furthermore, the method includes controlling an autonomous vehicle based on the radar unit being operated with the determined offset.

In another aspect, the present application describes a vehicle. The vehicle includes a radar unit. The radar unit is configured to transmit a plurality of radar signals, from a plurality of different locations of a vehicle, and receive a plurality of reflection signals, wherein each reflection signal is associated with one of the transmitted radar signals. Additionally, the apparatus includes a mounting plate configured to couple the radar unit to a mounting structure on a vehicle. The apparatus also includes a computational unit configured to perform operations. The computational unit is configured to determine at least one stationary object that caused a reflection in the plurality of radar signals. The computational unit is further configured to based on the determined stationary object, determine an offset for the radar unit. Additionally, the computation unit is configured to operate the radar unit based on the determined offset. Further, the computation unit is configured to control the vehicle based on the radar unit being operated with the determined offset.

In yet another example, a computing device is provided. The computing device may include a processor and a computer readable medium having stored thereon program instructions that when executed by the processor cause the computing device to perform functions. The functions include causing the transmission of a plurality of radar signals from a plurality of different locations by a radar unit of a vehicle. The functions also include, causing the reception of a plurality of reflection signals, where each reflection signal is associated with one of the transmitted radar signals. The functions additionally include determining at least one stationary object that caused reflection in the plurality of reflection signals. Further, the functions include based on the determined stationary object, determining an offset for the radar unit. Furthermore, the functions include operating the radar unit based on the determined offset. Additionally, the functions include controlling an autonomous vehicle based on the radar unit being operated with the determined offset.

In another aspect, the present application describes an apparatus. The apparatus may be configured for determining an offset for automotive radar based on unstructured data. The apparatus may further include means for transmitting a plurality of radar signals from a plurality of different locations by a radar unit of a vehicle. The apparatus also includes means for receiving a plurality of reflection signals, where each reflection signal is associated with one of the transmitted radar signals. Additionally, the apparatus includes means for determining at least one stationary object that caused reflection in the plurality of reflection signals. Further, the apparatus includes based on the determined stationary object, means for determining an offset for the radar unit. The apparatus yet further includes means for operating the radar mean based on the determined offset. Furthermore, the apparatus includes means for controlling an autonomous vehicle based on the radar means being operated with the determined offset.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
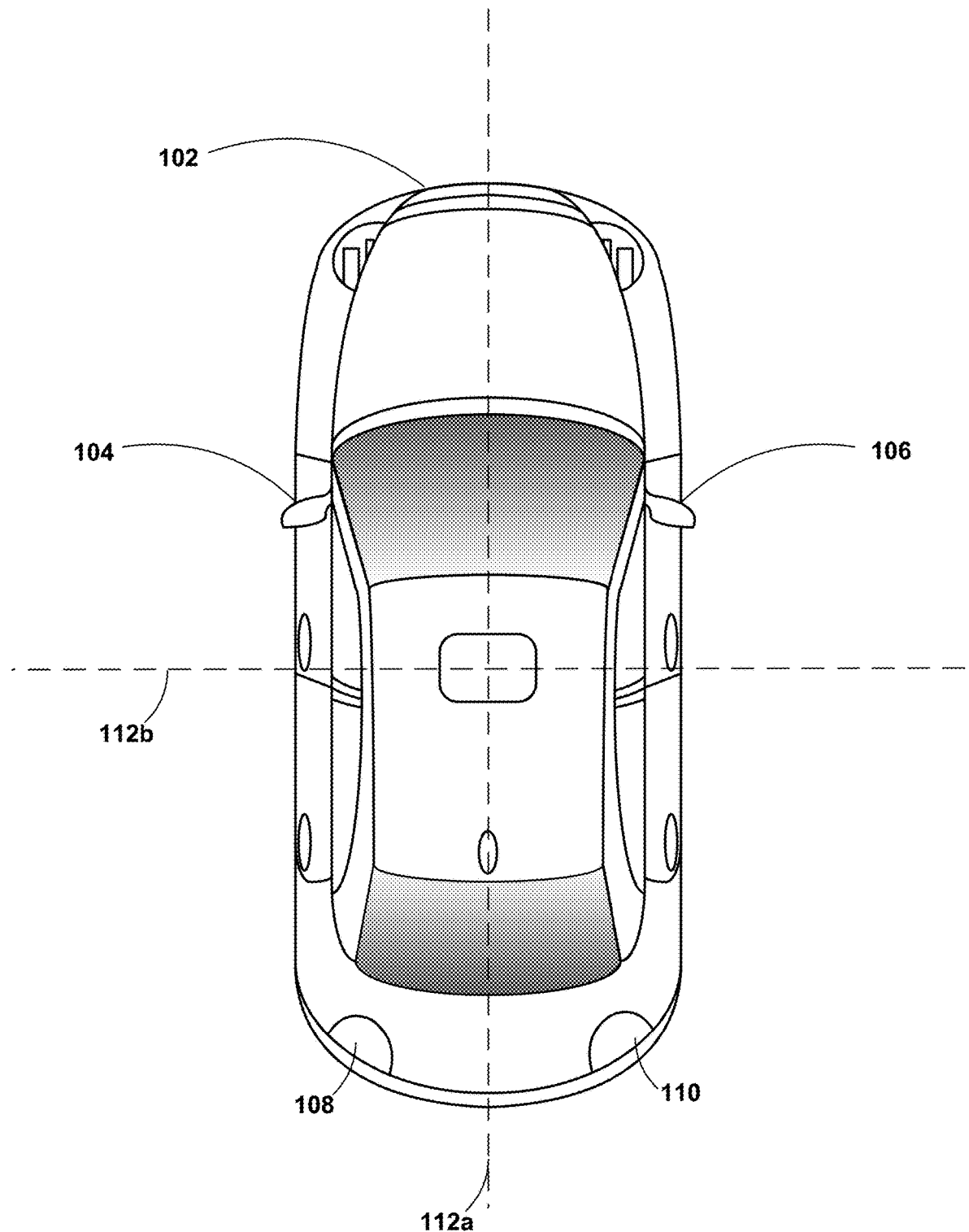
FIG. 1 illustrates an example layout of radar sectors.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for automotive sensor offset determination based on the capture of unstructured data. In practice, vehicular radar systems may feature multiple radar units with each radar unit having an associated field of view. Typically, the alignment of the various radar units was a time-consuming labor-intensive procedure requiring precise measurements and many expensive tools. The apparatus and methods presented herein allow the offset determination of radar units in a more time efficient and equipment-efficient manner.

Traditionally, vehicular radar systems have featured a single radar unit looking in a forward direction. These traditional radar systems would also typically only direct the radar beam in a single direction. When a vehicle has only a single radar unit with a beam that only was directed in a single direction, the precision required in the placement of the radar unit may be not as great as systems with multiple radar units with steerable beams. The non-steerable beam only interrogating one direction may cause the lower precision requirement. For example, a traditional vehicular radar system may only be configured to detect the presence of another vehicle directly in front of the vehicle having the radar system. Thus, as long as a radar beam generally points in the forward direction the traditional radar system would be able to detect the vehicle.

More advanced radar systems may be used with a vehicle in order to obtain a wider field of view than just that directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the vehicle. In some examples, multiple radar units may be combined with steerable radar beams to further increase the interrogation region and the imagining resolution of the vehicular radar system.

An example radar system for use with the present disclosure may include multi-sector 90-degree field of view radar antenna architecture that may enable an antenna to both scan across approximately 90-degrees of the azimuth plane (e.g. the horizontal plane) while also being mountable on various surfaces of a vehicle. Having a radar antenna with a 90-degree field of view may enable a radar system to scan a full 360 azimuth plane by having four radar units each configured to scan one 90-degree non-overlapping sector. Therefore, the example disclosed radar system may be able to steer a radar beam to interrogate the entire region in the azimuth plane of the vehicle. So that for example, four such radars located on four corners of a vehicle would provide a full 360 coverage around the vehicle. For example, a system such as this may aid in autonomous driving of a vehicle.

When each radar unit can scan or span a 90-degree region, placing 4 radar units on a vehicle may enable the vehicle to scan a beam over the full 360 azimuth plane. Each of the four radar units may be configured to scan a beam over one sector (i.e. one quarter of the azimuth plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360 azimuth plane. Additionally, in some examples, radar units may have overlapping scanning segments of the azimuth plane.

In some examples, the radar sectors may be defined based on where the radar units may be mounted on the vehicle. In one example, one radar unit may be mounted in each of the side mirrors of the vehicle. The other two radar units may be mounted behind the taillights of the vehicle. In this example, the quadrants may be defined based on axes where one axis aligns with the direction of vehicular motion and the other axis aligns with the middle of the vehicle from front to back. In another example, the radar units may be mounted in order to have one pointing forward, one pointing backward, and one pointing to each side. In this second example, the axes of the quadrants may be at a 45-degree angle to the direction of motion of the vehicle. Additionally, the radar unit may be mounted on top of the vehicle.

The modular multi-sector 90-degree field of view radar antenna architecture may be able to steer the radar beams emitted from each radar unit. The radar beams may be steered by the radar units in various ways. For example, in some embodiments, the radar units may be able to steer the beam in an approximately continuous manner across the 90-degree field of view for the respective antenna or the radar units may be configured with sectoral sub beams spanning the 90 degrees. In other embodiments, the radar units may be able to steer the radar beam to predetermined directions within the 90-degree field of view for the respective antenna.

One aspect of the present disclosure provides an apparatus for the calibration of the placement of radar sensor units on a vehicle. For vehicular radar, in some instances, it may be desirable to have a 360-degree Field of View (FOV). By having data from 360 degrees, the vehicle may more accurately sense objects near the vehicle to aid in safe driving and navigation. The present disclosure may use multiple separate radar sensor units, each configured to scan over a portion of the azimuth plane to achieve a full 360 FOV.

In some approaches, the vehicle may be configured with multiple radar units. For ease of explanation of the present disclosure, it will be assumed that the vehicle has four radar units; however, more or fewer radar units. In examples with four radar units, each radar unit may be configured to each scan over one particular quadrant (i.e. 90 degrees) of the azimuth plane of the vehicle. In traditional approaches, it may be desirable to locate the radar sensor units on the vehicle with high accuracy. For example, it may be desirable for each radar unit to have an angular tolerance of ±1 degree in both the azimuth and elevation planes. Unlike traditional systems, the present disclosure provides a radar apparatus and method that allows the radar units to have a larger angular tolerance, but enables radar calibration through a calculation of a radar offset.

The radar calibration of the present disclosure is based on making radar measurements. Radar units may be mounted to a vehicle without using the traditional low-tolerance alignment. In order to operate the radar system, an offset (or lack of offset) may be calculated for each of the radar units coupled the to the vehicle. Once the offset for each radar unit is calculated, the radar unit may be operated with the vehicle in a manner similar to that if the radar units had been aligned using the traditional low-tolerance alignment.

The method for calibrating the radar system may include operating the vehicle on which the radar units are mounted while making radar measurements at several locations. In some examples, the several locations may be a series of locations as the vehicle is traveling. The several locations may be relatively closely spaced to each other (e.g. within a few feet) so that the radar system may be able to see at least some of the same objects causing radar reflections across at least a subset of the several locations. A processor of the system may attempt to determine which objects that cause radar reflection are stationary objects.

Based on the measurements taken with the radar calibration apparatus at each location, the radar reflections of the stationary object(s) may be analyzed. When a static object is seen by a radar unit when the radar unit is at a plurality of different positions, the system may be able to determine the alignment for the radar unit. The alignment may include both and azimuth angle offset and an elevation angle offset. The azimuth angle offset and elevation angle offset for each radar unit may be stored in a memory. Based on the azimuth angle offset and elevation angle offset, the radar unit may be operated as if it had been mounted with more precise tolerances. In some embodiments, the offsets may only be calculated with respect to either azimuth or elevation angle.

If a radar (coupled to a vehicle) is moving and if the scene around the radar is stationary, then it is possible to solve for the unknown radar position and orientation with respect the navigation frame of the radar's platform. Scenes are rarely completely stationary, especially if unstructured, so the present method and apparatus solve the harder problem of also distinguishing between moving and stationary elements of the scene. Taken jointly, this represents a very difficult estimation problem. Disclosed herein is a solution that employs an expectation maximization approach to iteratively converge to a correct estimate of the unknown parameters.

FIG. 1 illustrates an example layout of radar sectors for an autonomous vehicle 102. As shown in FIG. 1, each of the radar sectors may have an angular width approximately equal to the scanning range of the radar units (as will be described with respect to FIG. 2). For example, the sectors of FIG. 1 divide the azimuth plane around the autonomous vehicle 102 into 90 degree sectors. However, in examples where the radar units are configured to scan a radar beam over a different angle than 90 degrees (not shown), the width and number of sectors may change. Although FIG. 1 shows a car, the methods and apparatuses presented herein may be used with other vehicular systems as well, such as aircraft, boats, etc.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45-degree angle with respect to the two axes of the vehicle 102. By mounting each radar unit a 45 degree angle with respect to the two axes of the vehicle 102, a 90 degree scan of the radar unit would scan from one vehicle axis to the other vehicle axis. For example, a radar unit mounted at a 45-degree angle to the axes in side mirror unit 104 may be able to scan the front left sector (i.e. from the vertical axis 112a through the front of the vehicle 102 to the axis 112b that runs through the side of the vehicle). An additional radar unit may be mounted at a 45-degree angle to the axes in side mirror unit 106 may be able to scan the front right sector. In order to scan the back right sector, a radar unit may be mounted in taillight unit 110. Additionally, in order to scan the back left sector, a radar unit may be mounted in taillight unit 108. The radar unit placements shown in FIG. 1 are merely one example. In various other examples, the radar units may be placed in other locations, such as on top of the vehicle, or within or behind other vehicle components. Further, the sectors may also be defined differently in various embodiments. For example, the sectors may be at a 45-degree angle with respect to the vehicle. In this example, one radar unit may face forward, another backward, and the other two to the sides of the vehicle.

In some examples, all the radar units of vehicle 102 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, a vehicle 102 with one radar unit would need that radar unit to be able to scan over the full 360 degrees.

If the vehicle 102 had two radar units, each would scan approximately 180 degrees. For three radar units, each would be configured to scan 120 degrees. For four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 2:
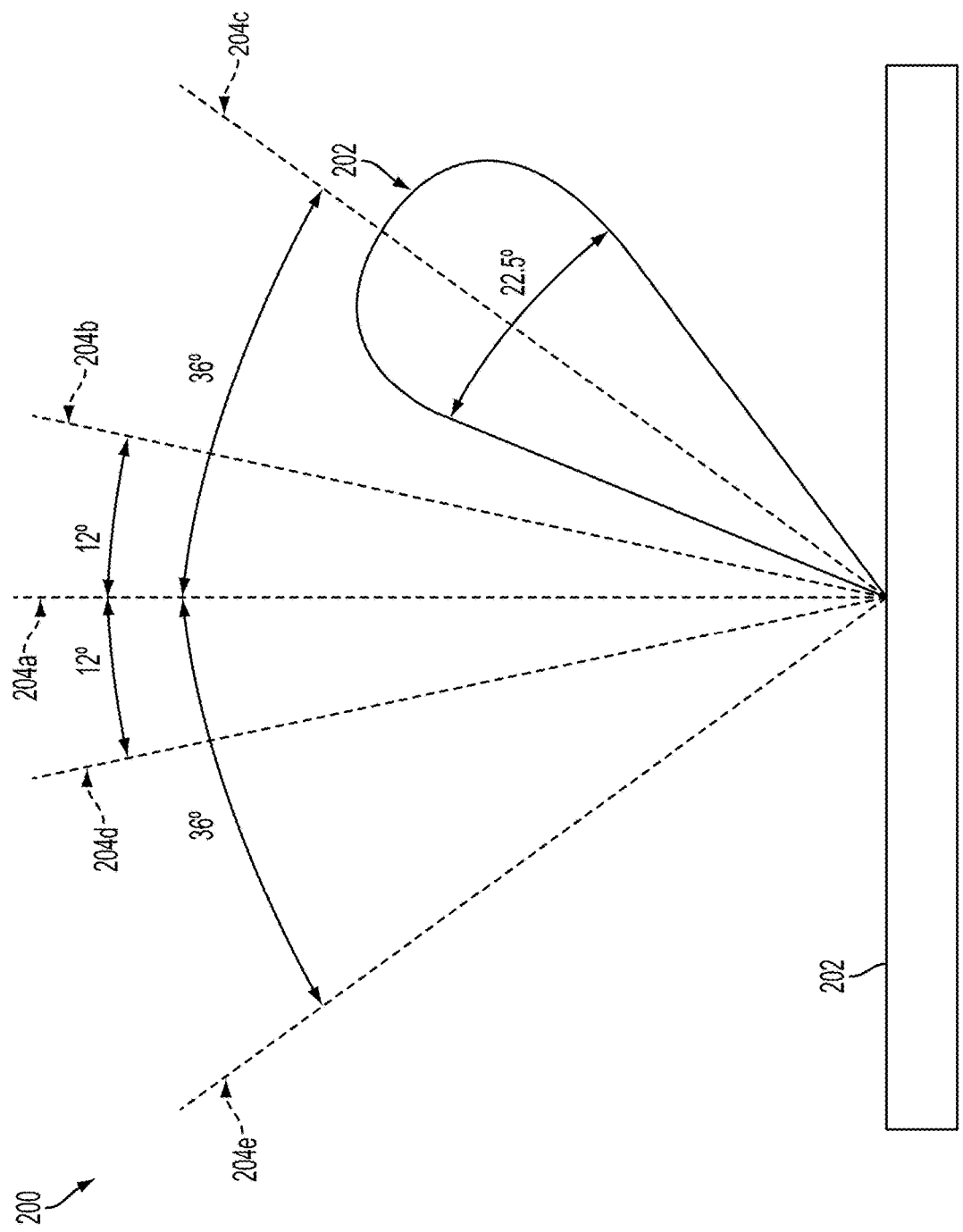
FIG. 2 illustrates example beam steering for a sector for a radar unit.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth plane. In other embodiments, the radar unit 200 may be able to scan the radar beam in discrete steps across the various angles of the azimuth plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90-degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees 204e, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of the radar beam 206 may be varied depending on the specific example.

For example, and further discussed below, a radar beam of a radar unit may be configured to only scan a 60-degree region. If a radar unit can scan a 60-degree region, six radar units may be used to scan a full 360 azimuth plane. However, if the radar unit can scan 90 degrees, four radar units may scan the full 360 azimuth plane.

Figure 3:
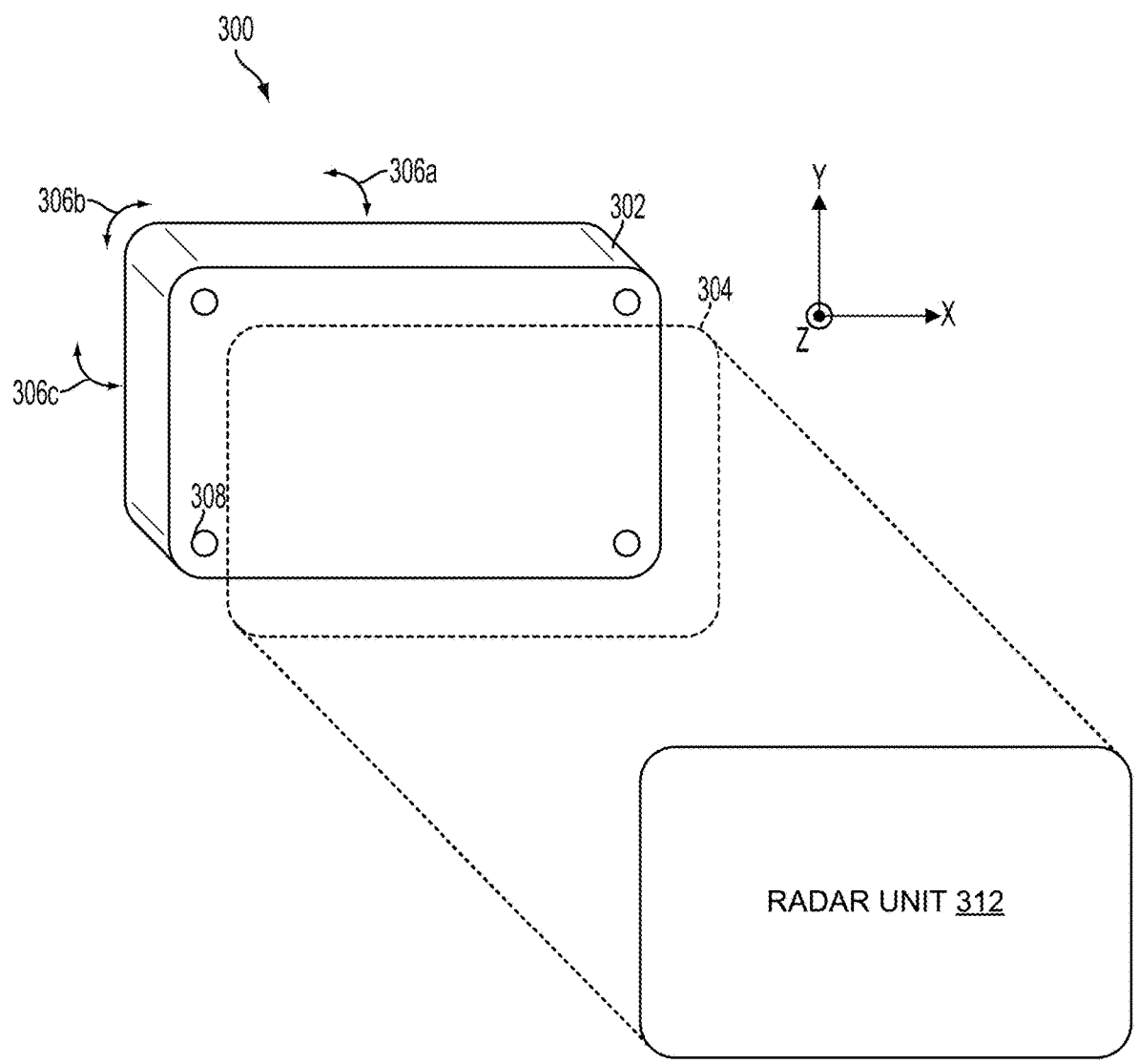
FIG. 3 illustrates an example radar unit mounting.

FIG. 3 illustrates an example radar unit mounting structure 300. In one example embodiment, a radar unit mounting 300 may include a mounting baseplate 302 and an associated mounting location 304 where a radar unit 312 may be mounted to the mounting baseplate 302. The mounting location 304 may be the location where the radar unit 312 may be mounted to the mounting baseplate 302 while performing method 500 of FIG. 5. Additionally, during operation of the autonomous vehicle, radar units 312 may be mounted to the mounting baseplate 302 in place of mounting location 304. In even further embodiments, the radar unit 312 and the mounting baseplate 302 may be integrated as one unit and not separate components.

A mounting baseplate may be located at each location where a radar unit may be coupled to the autonomous vehicle. For example, each radar unit mounting location (such as locations 104, 106, 108, and 110 of FIG. 1) may have a mounting baseplate 302 to which a radar unit may be mounted. As shown in FIG. 3, the mounting baseplate 302 may include mounting holes (one of which is labeled 308) configured to both align the radar unit when mounted as well as allow the radar unit to be coupled to the mounting baseplate 302 with attachment devices such as screws. The mounting baseplate 302 of FIG. 3 is one example of a way the various radar units may be mounted to an autonomous vehicle.

When radar unit 312 is mounted to mounting baseplate 302, the radar unit 312 may not be exactly aligned as designed. This misalignment may manifest as an offset from the desired mounting position. For example, the radar unit 312 may have an offset when coupled to mounting baseplate 302 in terms of the elevational angle offset 306a, roll angle offset 306b, and azimuthal angle offset 306c. Additionally, the radar unit 312 may have an offset when coupled to mounting baseplate 302 in terms of the X offset, Y offset, and Z offset. In some embodiments, it may be desirable for a radar unit to be mounted within a threshold range around a desired direction. If the radar unit mounted within the threshold range, the offset of the radar unit may be calculated. When the offset is calculated, the processing system that processes radar signals may be able to account for the offset through data processing. For example, each of the elevational angle 306a, roll angle 306b, and azimuthal angle 306c may have a threshold range of ±1 degree from the desired elevational angle, roll angle, and azimuthal angle. By determining the offsets, the processing system may mathematically compensate for the difference between the desired alignment and the actual alignment.

Figure 4:
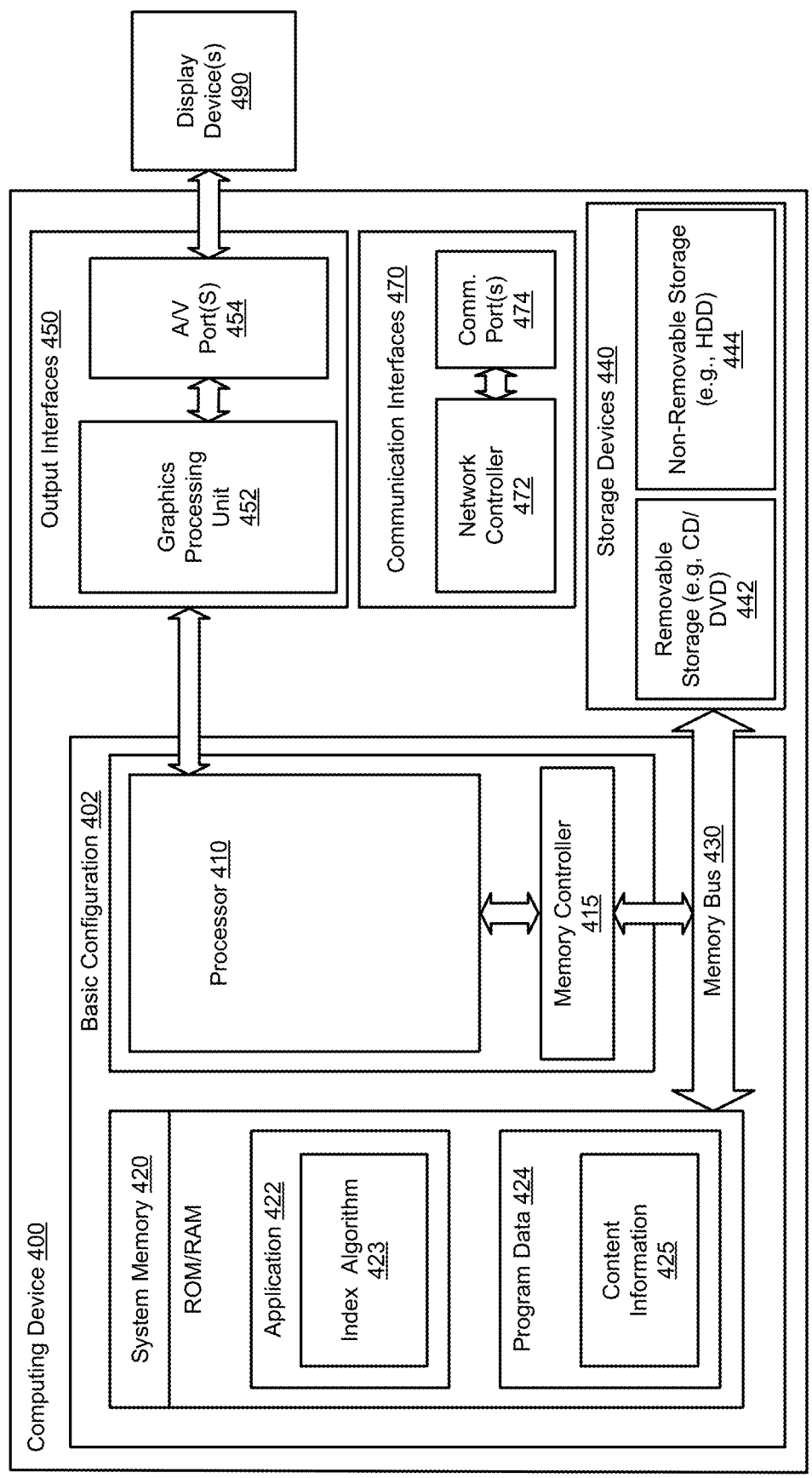
FIG. 4 illustrates an example computing device for performing some of the methods disclosed herein.

In some embodiments, a computing device may implement the disclosed methods as computer program instructions encoded on a non-transitory computer-readable storage media in a machine-readable format, or on other non-transitory media or articles of manufacture. The computing device may be integrated within the vehicle or it may be a separate computing device in communication with the vehicle. FIG. 4 is a schematic illustrating a conceptual partial view of an example computer program product that includes a computer program for executing a computer process on a computing device, arranged according to at least some embodiments presented herein.

FIG. 4 illustrates a functional block diagram of a computing device 400, according to an embodiment. The computing device 400 can be used to perform functions in connection with a reconfigurable mobile device with a balloon network. In particular, the computing device can be used to perform some or all of the functions discussed above in connection with FIGS. 1-5.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (μP), a microcontroller (μC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, over a network communication by way of one or more communication ports 474. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium such as, but not limited to, a hard disk drive, a CD, a DVD, a digital tape, or memory. In some implementations, the signal bearing medium can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard or other transmission protocol).

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
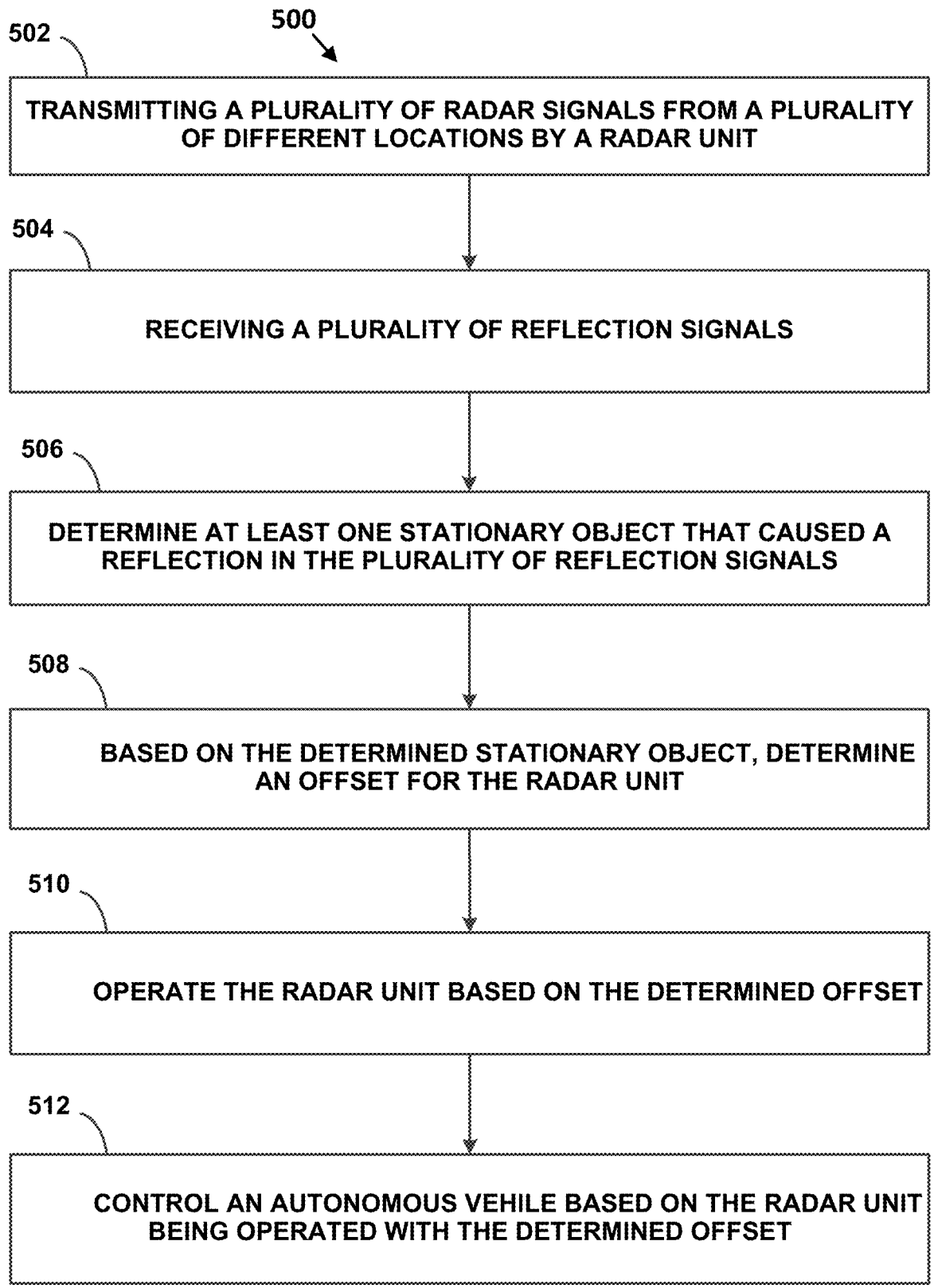
FIG. 5 is an example method for radar mounting estimation with unstructured data.

FIG. 5 is an example method for radar mounting estimation with unstructured data. Moreover, the method 500 of FIG. 5 will be described in conjunction with FIGS. 1-4. At block 502, the method 500 includes transmitting a plurality of radar signals from a plurality of different locations by a radar unit of a vehicle. A vehicular radar system may be configured to interrogate the region around the vehicle via multiple radar units. To interrogate the region around the vehicle, the radar system may transmit the radar beam in a given direction. The transmitted beam may reflect off objects in the region.

At block 504, the method 500 includes receiving a plurality of reflection signals, wherein each reflection signal is associated with one of the transmitted radar signals. The received reflections may allow the radar system and a computer to determine what objects are located near the vehicle. Not only may objects themselves be determined, but the location (i.e. angle and range to objects) may be determined as well. In order to operate correctly, radar units of the radar system need to both be placed in correct locations and have fairly precise alignment.

In some examples, blocks 502 and 504 may be repeated several times. In one examples, the radar path may be divided into many consecutive coherent processing intervals (CPIs). During a CPI the radar unit both transmits and receives a waveform, applies a matched filter bank, and extracts a set of detections that measure range, Doppler, and angle (in azimuth, elevation or both) to the various objects that reflect radar. This data may be stored in a memory for further processing. In some examples, several CPIs are captured before moving to data processing.

At block 506, the method 500 includes determining, by a processor, at least one stationary object that caused reflection in the plurality of reflection signals. By analyzing the collected data, an algorithm may use a current best guess at radar mounting calibration, determine which measurements arise from stationary objects.

To determine which object that cause radar reflections are stationary, a problem is defined as one of parameter estimation where the unknown parameters are radar mounting angles and position with respect to the car body system. Fundamentally, this calculation amounts to maximizing the correspondence between scattering objects in both the Doppler and angle domains.

A pulse-Doppler radar may be able to measure range, Doppler, and 2D bearing to the various objects that cause radar reflections. In the general case all 3 orientation degrees of freedom (elevational, rotational, and an azimuthal) and 3 position degrees of freedom (X, Y, and an Z) are estimated. In some examples, the system may be configured to only calculated the azimuth offset with respect to the vehicle.

In one example, the derivation is shown for a 2D car vehicle coordinate system. Other means of calculating stationary objects and the offsets may be used as well. The following variables are used to calculate offsets.

$$v = \text{vehicle velocity}$$
$$\theta = \text{mounting angle}$$
$$\phi_i = \text{bearing angle to } i-\text{th scatterer}$$
$$d_i = \text{doppler to } i-\text{th scatterer}$$
$$z_i = \text{stationary indicator for } i-\text{th scatterer}$$
$$N = \text{\# scatterers}$$
$$\hat{} = \text{denotes a realization of a random variable}$$
$$N(x; \mu, P) \text{evaluates at } x \text{ a Gaussian with mean } \mu \text{ and variance } P$$

Assume that the the measured reflection signals include independent and identically distributed Gaussian noise. The Gaussian noise may be defined as $w_1$ and have a variance $P_b$.

So the bearing angle may be defined as, $$\hat{b}_i = \phi_i - \theta + \hat{w}_1$$

Similarly, the Doppler measurement may be modeled, including Gaussian noise $w_2$ having variance $P_d$, as, $$\hat{d}_i = \frac{2}{\lambda}[\cos(\phi_i)\sin(\phi_i)](-v) + \hat{w}_2$$

A likelihood $\psi$ may be defined that will calibrate the system if all scatterers are stationary. On average, if the mounting angle is ideally aligned, then the joint likelihood of the measurement is at its maximum, where the likelihood defined as, $$\psi(\theta, \phi) = \prod_i \psi_i(\theta, \phi\_i)$$
$$= \prod_i^N (2\pi\sqrt{P_d P_b})^{-1}$$
$$\exp\left[\frac{-(\hat{b}_i - \phi_i + \theta)^2}{2P_b} + \frac{-\left(d_i - \frac{2}{\lambda}[\cos(\phi_i)\sin(\phi_i)](-v)\right)^2}{2P_d}\right]$$

Note that Doppler and bearing measurements are uncorrelated since the equations are conditioned on scatterer position and mounting angle.

In practice some unknown subset of the measurements will be made on objects that are in motion. An additional set of hidden random variables, z, that indicate the stationarity of an object may be used. Because the algorithm iteratively approximates the unknown parameters, on the n-th step previous estimate of unknown parameters $\hat{\theta}$ and $\hat{\varphi}$ will be denoted. Via the method of expectation maximization, the iterative estimation equation is then, $$\theta, \phi = \max_{\theta, \phi} \left\{ \sum_i p(z_i = 1 \mid \hat{b}, \hat{d}, \hat{\phi}_i, \hat{\theta}) \log(\Psi_i) \right\}$$

By treating the realization z_i=0 as one where the likelihood ψ is uninformative (since there is no longer a deterministic relationship between Doppler and bearing) and taking the prior $p(z_i|\theta, \varphi_i)$ as uninformative the equation may be simplified.

This stage of processing may make an estimate of $p(z|\hat{b}, \hat{d}, \hat{\varphi}, \hat{\theta})$. This estimate may be made because the collection period is long enough to assure many measurements are made on each object in the scene. In so doing, the system will have enough data to perform temporal processing. This detection problem may be decomposed into two pieces: assignment and estimation. Assignment is the mapping of measurements to objects as well as the estimation of the number of underlying objects. Estimation is the calculation of the stationarity indicator variable posterior for each object. This probability is then mapped to the measurement associated with that object. Thus, stationary objects may be identified.

At block 508, the method 500 includes based on the determined stationary object, determining, by the processor, an offset for the radar unit. Using the determined stationary object, the system may compute a best guess of radar position and orientation. The radar position and orientation may include at least one offset. A maximum likelihood estimate (MLE) of mounting angle is somewhat complicated by the presence of nuisance variables $\phi_i$.

The estimate may be marginalized out or included as unknown parameters in the MLE—we choose here to perform the latter. The MLE objective function as the negative log likelihood.

$$L(\theta, \phi) = \sum_i^N \left[ \frac{(\hat{b}_i - \phi_i + \theta)^2}{P_b} + \frac{\left(d_i - \frac{2}{\lambda}[\cos(\phi_i)\sin(\phi_i)](-v)\right)^2}{P_d} \right]$$

The minimum of the MLE may be found via Newton's method. The key to the method is calculating the Hessian (N+1 by N+1 matrix H) and Jacobian (N+1 column vector J) of the likelihood.

$$J = [J_\theta J_1 J_2 \cdots J_N]^T$$

$$J_\theta = N\theta P_b^{-1}$$

$$J_i = -(b_i + \theta - \phi_i) P_b^{-1} +$$

$$\left(d_i - \frac{2}{\lambda}[\cos(\phi_i)\sin(\phi_i)]v\right) P_d^{-1} \left(d_i - \frac{2}{\lambda}[-\sin(\phi_i)\cos(\phi_i)]v\right)$$

$$H = [H_{\theta,\theta} H_{\theta,1} H_{\theta,2} \ldots H_{\theta,N}; H_{1,\theta} H_{1,1} \ldots H_{1,N}; \ldots : H_{n,\theta} H_{n,1} \ldots H_{N,N}]^T$$

$$H_{\theta,\theta} = N P_b^{-1}$$

$$H_{\theta,i} = H_{i,\theta = -P_b^{-1}}$$

$$H_{i,j} = P_b^{-1} + \left(\hat{d}_i - \frac{2}{\lambda}[\cos(\phi_i)\sin(\phi_i)]v\right) P_d^{-1} \left(\frac{2}{\lambda}[\cos(\phi_i)\sin(\phi_i)]v\right) +$$

$$\left(-\frac{2}{\lambda}[-\sin(\phi_i)\cos(\phi_i)]v\right)^2 P_d^{-1}$$

$$H_{i,j,i\neq j} = 0$$

Starting with some guess $\hat{\ }$, $\hat{\ }$ for the unknown parameters, they are updated by the following rule until convergence, $$[\hat{\theta}, \hat{\phi}]^T = [\hat{\theta}, \hat{\phi}]^T - \gamma H^{-1} J$$

Where Y is some scale factor less than one. In some examples Y is 1*10^-2.

The calculated MLE gives the offset for the respective radar unit. The previously-discussed calculation (or different calculations) may be used to determine an offset for each radar unit of the vehicle. In some examples, a radar unit may have the correct alignment, thus the determined offset may be zero degrees.

At block 510, the method 500 includes, operating the radar unit based on the determined offset. Once offsets are determined, the offset may be used by the processing system when locating various objects that cause radar reflections. For example, if an offset is determined to be 2 degrees in the positive azimuth direction, the processing system can compensate for this offset. In some examples, the processing system may operate the radar unit by applying the the offset to the calculation of a reflective object. That is, if the offset is +2 degrees in the azimuth plane, and an object appears to be at +15 degrees of azimuth, the system may adjust for this +2 degree offset and operate knowing that the reflecting object is really at +17 degrees (i.e. +15+2=+17) in the azimuth plane. In some other examples, different mathematical functions may be used to determine the position of the reflecting objects based on the determined offset.

At block 512, the method 500 controlling an autonomous vehicle based on the radar unit being operated with the determined offset. Because the radar unit is operated with the determined offsets at block 510, this radar information may be used with the navigation system of the vehicle to autonomously control the vehicle. While operating in the autonomous mode, the vehicle may use a computer system to control the operation of the vehicle with little-to-no human input. For example, a human-operator may enter an address into an autonomous vehicle and the vehicle may then be able to drive, without further input from the human (e.g., the human does not have to steer or touch the brake/gas pedals), to the specified destination.

While the vehicle is operating autonomously, the sensor system may be receiving data about the environment of the vehicle from the radar system. The processing system of the vehicle may alter the control of the vehicle based on data received from the various sensors. In some examples, the autonomous vehicle may alter a velocity of the autonomous vehicle in response to data from the various sensors. The autonomous vehicle may change velocity in order to avoid obstacles, obey traffic laws, etc. When a processing system in the vehicle identifies objects near the autonomous vehicle, the vehicle may be able to change velocity, or alter the movement in another way. The location information used by the vehicle may be provided by the methods and systems disclosed herein.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method comprising:
   determining, by a processor, at least one stationary object that caused reflection in a plurality of received reflection signals;
   based on the determined stationary object, determining, by the processor, offsets for a plurality of radar units, wherein each radar unit is configured to transmit and receive radar signals, and wherein the offsets for a given radar unit depends on a desired position for the given radar unit and comprises at least two of an elevational offset, a rotational offset, and an azimuthal offset; and
   operating the plurality of radar units by compensating for the determined offsets to determine a position of an object causing radar reflections.

2. The method according to claim 1, wherein the plurality of radar units are mounted at approximately a 45-degree angle with respect to the vehicle.

3. The method according to claim 1, wherein the offsets for one or more radar units from the plurality of radar units further comprises at least one of a lateral offset and a vertical offset.

4. The method according to claim 1, further comprising: storing in a memory the determined offsets for the plurality of radar units.

5. A vehicle comprising:
   a plurality of mounting plates each configured to couple a radar unit to a mounting structure on the vehicle; and
   a computational unit configured to perform operations comprising:
   determine at least one stationary object that caused a reflection in a plurality of received radar signals;
   based on the determined stationary object, determine offsets for a plurality of radar units, wherein each radar unit is configured to transmit and receive radar signals, and wherein the offsets for a given radar unit depends on a desired position for the given radar unit and comprises at least two of an elevational offset, a rotational offset, and an azimuthal offset; and
   operate the plurality of radar units by compensating for the determined offsets to determine a position of an object causing radar reflections.

6. The vehicle according to claim 5, wherein the plurality of radar units are mounted at approximately a 45-degree angle with respect to the vehicle.

7. The vehicle according to claim 5, wherein the offsets for one or more radar units from the plurality of radar units further comprises at least one of a lateral offset and a vertical offset.

8. The vehicle according to claim 5, further comprising a memory configured to store the determined offsets.

9. An article of manufacture including a non-transitory computer-readable medium, having stored thereon program instructions that, if executed by a computing device, cause the computing device to perform operations comprising:
   determining, by a processor, at least one stationary object that caused reflection in a plurality of received reflection signals;
   based on the determined stationary object, determining, by the processor, offsets for a plurality of radar units, wherein each radar unit is configured to transmit and receive radar signals, and wherein the offsets for a given radar unit depends on a desired position for the given radar unit and comprises at least two of an elevational offset, a rotational offset, and an azimuthal offset; and
   operating the plurality of radar units by compensating for the determined offsets to determine a position of an object causing radar reflections.

10. The non-transitory computer readable medium according to claim 9, wherein the plurality of radar units are mounted at approximately a 45-degree angle with respect to the vehicle.

11. The non-transitory computer readable medium according to claim 9, wherein the offsets for one or more radar units from the plurality of radar units further comprises at least one of a lateral offset and a vertical offset.

12. The non-transitory computer readable medium according to claim 9, further comprising storing in a memory the determined offsets.

* * * * *